March 28, 1967 A. B. BLACKBURN 3,311,780
ALTERNATING CURRENT ARC WELDING SYSTEM WITH A HIGH
FREQUENCY VOLTAGE SUPERPOSED THEREON
Filed Dec. 22, 1964
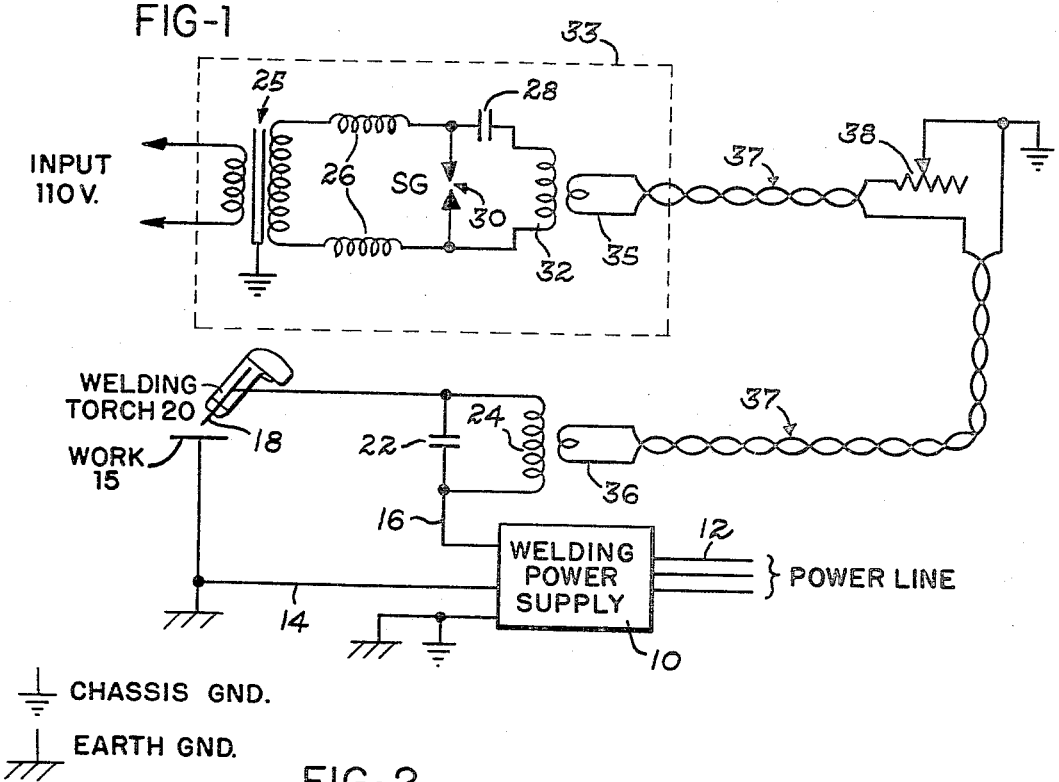
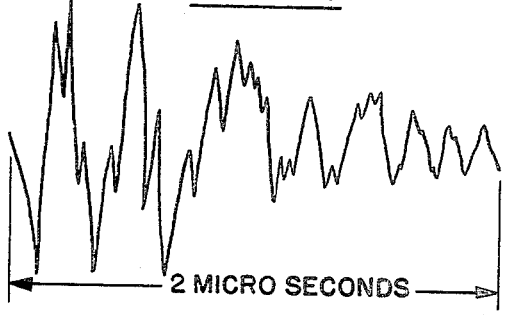
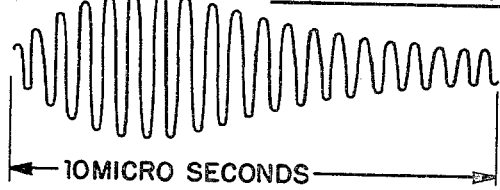
INVENTOR.
ALAN B. BLACKBURN
BY
*Marechal, Biebel, French & Bugg*
ATTORNEYS

United States Patent Office 3,311,780
Patented Mar. 28, 1967

3,311,780
ALTERNATING CURRENT ARC WELDING SYSTEM WITH A HIGH FREQUENCY VOLTAGE SUPERPOSED THEREON
Alan B. Blackburn, Troy, Ohio, assignor to Hobart Brothers Company, Troy, Ohio, a corporation of Ohio
Filed Dec. 22, 1964, Ser. No. 420,278
6 Claims. (Cl. 315—163)

This invention relates to welding apparatus, and more particularly to apparatus which may be used for inert gas shielded arc welding.

In the art of A.C. welding, various proposals have been made to assure reignition of the arc in the reverse polarity half-cycle. One form of device commonly used provides a high frequency, high voltage, but relatively small alternating current which is passed through the welding circuit, in addition to the normal alternating welding current, to break down the gap between the electrode and the workpiece. Generally, enough energy must be provided in the high voltage spark discharge to produce sufficient ionization to permit the welding arc to be established.

Other, somewhat less frequent, uses of a high frequency, high voltage supply are for starting D.C. arcs, and for stabilizing low voltage, low current D.C. welding arcs, particularly where it is important to avoid a discontinuity in the weld.

An ideal source of high frequency energy for arc stabilization in such equipment is the spark gap oscillator. It is simple, economical, and the frequency of its output is relatively broad-band. However, use of the spark gap oscillator in such welding equipment has always proved difficult from the standpoint of minimizing radiant energy discharging from the equipment in that part of the spectrum normally used by communications equipment. As a result, the Federal Communications Commission in this country, has required that radio frequency (RF) energy radiated from such arc welding equipment be maintained within predetermined limits, which are known to those skilled in the art.

However, this limitation automatically results in various design considerations of equipment to limit the radiant RF energy, as by shielding, while still maintaining adequate high frequency energy available in the welding arc for purposes of starting and reignition.

The present invention has for its principal object the provision of a novel arc welding apparatus which can be used for arc welding, and which incorporates a spark gap oscillator as a source of high frequency energy while providing for autoamtic reduction in the amount of RF energy present in the welding circuit during operation of the welding apparatus.

Another object of the invention is to provide such novel welding apparatus wherein the welding circuit incorporates a resonant circuit which is coupled to a source of high frequency energy, whereby the resonant circuit provides for discrimination of the amount of RF energy present in the welding circuit for starting or reignition, such that as a result of establishing the welding arc the resonant circuit is detuned and the amount of RF energy present in the welding circuit is substantially reduced.

A further object of the invention is to provide such a welding apparatus wherein a high frequency generator, such as a spark gap oscillator, is loosely coupled into the resonant circuit incorporated in the welding circuit, such that little energy is transferred into the resonant circuit at any frequency other than frequencies to which the resonant circuit is tuned, thereby effectively filtering out most of the incidental frequencies from the oscillator.

An additional object of the invention is to provide a link coupling between a spark gap oscillator and a welding circuit such that the oscillator can be located remote from the welding apparatus where the oscillator can be properly shielded and such that the transmission line from the oscillator to the welder carries only low voltage to minimize radio frequency radiation, and leaving a minimum of high frequency high voltage lines exposed.

Another object of the invention is to provide in the aforementioned link coupling a grounded connection for the coupling link which reduces capacitive coupling of unwanted frequencies between the oscillator and the resonant circuit.

Another object of the invention is to include in the aforementioned link coupling an adjustable inductive reactance which provides a control of the high frequency intensity supplied to the resonant circuit of the welding apparatus.

Other objects and advantages of the present invention will become more apparent from the following description, the accompanying drawing and the appended claims.

In the drawing:

FIG. 1 is a schematic diagram of an arc welding apparatus suitable for A.C. arc welding, and incorporating the features of the present invention; and FIGS. 2 and 3 are plots showing oscillograms of the output wave form available in the welding circuit of a standard A.C. welding apparatus with superimposed high frequency, and apparatus according to the invention respectively.

Referring to the drawing which shows a preferred embodiment of the invention, and particularly with reference to FIG. 1, a suitable source of A.C. welding power is indicated at 10, in block form. This source may be any suitable supply, such as a variable inductance and transformer. It may be adapted to be connected to a commercial power input, for example, through the input lines 12, or it may be self-contained. One output line 14 of the power supply is grounded and preferably extends also to the workpiece 15. The other output line 16 extends also to the electrode 18, incorporated in a suitable torch 20, which may be of any desirable type. Formed as a part of the welding circuit line 16 is a resonant output circuit including the capacitor 22 and the inductance coil 24. The values of inductance and capacitance are selected, in known manner, to form a resonant circuit at a predetermined high frequency.

A high frequency generator is provided, for example, in the form of an input transformer 25 whose secondary or output winding is coupled through RF chokes 26 to a spark gap oscillator circuit. This circuit includes the capacitor 28 and spark gap 30, as shown, as well as the inductor coil 32. The chokes 26 are provided to protect the input transformer from radio frequency, thus special insulation is not needed in the transformer to prevent its breakdown, and conventional insulation, which is substantially less expensive, can be used thereby reducing the cost of the input transformer. The oscillator is provided with suitable shielding which is shown schematically at 33.

The output of the high frequency oscillator circuit is obtained by link coupling, through the small coils 35 and 36 connected via transmission line 37, between the inductance 32 in the oscillator circuit and the inductance 24 in the resonant circuit of the welder. Thus coils 32 and 35 serve as a step-down coupling means which substantially reduces the voltage or potential in the transmission line 37. This effectively minimizes RF radiation from this line and also simplifies the insulation requirements as to the transmission line. Twisting the leads of the transmission line helps to cancel the fields produced by the high frequency low voltage power carried through this line. Preferably, a wire wound rheostat 38 is incorporated in the link coupling circuit and is used as a variable resistor/inductor to control the transmitted output voltage of the oscillator, and hence to control the high frequency intensity. Coils 24 and 36 provide a stepup coupling means which constitutes the input to the welding circuit. The coupling between these coils is rather loose, and thus quite selective as to frequency response.

The potential of the high frequency output from the oscillator circuit is amplified to some extent by the step-up turns ratio between the coils 36 and 24. In addition, due to the fact that the circuit provided by coil 24 and capacitor 22 is resonant at the basic output frequency of the oscillator, the high frequency power available in the welding circuit is substantial because at resonance the impedance of the circuit is quite low. Thus an adequate amount of high frequency energy is available for starting the arc, either initially or at no welding load. Once the welding arc is established, the heavy low frequency current through the inductor 24 will cause the resonant circuit to be detuned during welding, and the high frequency power in the welding circuit is substantially decreased, although some small amount of high frequency energy is still available due to transformer action of coils 36 and 24. If the arc extinguishes, the resonant circuit is quickly reestablished to assure reignition, particularly when inert gas shielding is used at the arc. As a result of the substantial decrease in high frequency energy in the welding circuit, during welding, the radiation level of RF energy drops considerably, and can be maintained well within acceptable limits.

Further reduction in RF energy during welding can be obtained by providing the inductor 24 with a powered iron core or equivalent, which will result in even greater detuning of the resonant circuit when the welding current passes through the inductor 24.

As an example, apparatus has been successfully constructed and operated in accordance with the present invention, using an inert shielding gas, and welding power of approximately 500 amperes at 10 to 80 volts A.C. (60 cycle) depending upon the load. The turns ratio of the link coupling at the oscillator was 9:3, as between coils 32 and 35, and capacitor 28 had a value of 0.003 mf. The turns radio between coils 36 and 24 was 2:11, with the coil 24 being of rectangular form, and made of wire of rectangular cross-section, sufficiently heavy to handle the welding currents involved. The resonant circuit made up of inductor 24 and capacitor 22, the latter having a value of 0.001 mf., was designed to resonate at approximately two megacycles.

FIG. 2 is a plot made from a photograph taken of the sweep display of an oscilloscope, with the sweep driven from a pickup in the welding circuit which transmits to the oscilloscope sweep circuit a voltage corresponding to the changing voltage in the welding circuit. The length of the sweep trace shown in FIG. 2 corresponds in time to approximately two microseconds. This plot shows the voltage wave form in a prior art welding circuit, with the irregularity in the trace resulting from substantial harmonics impressed on the welding circuit from the high frequency oscillator.

FIG. 3 is a plot made in a similar manner from a photograph of an oscilloscope with its sweep circuit driven from a pickup connected to the present apparatus. The sweep length here is about ten microseconds. The reduction in harmonics and the reduction of side band frequencies in the welding circuit is apparent, since the voltage trace is regular and lacks the jagged or irregular wave form characteristic of the presence of harmonic frequencies. The plot shown in FIG. 3 illustrates the fact that with the present invention harmonics are essentially non-existent in the welding circuit, and only the specific high frequency is transmitted. As a result, by detuning the circuit from this frequency, substantially all high frequency oscillations can be eliminated from the welding circuit.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. In arc welding apparatus having a source of welding power to be connected to a workpiece and to an electrode to form a welding circuit for establishing a welding arc between the electrode and the workpiece, and a high-frequency generator circuit providing a source of high-frequency alternating current to be superimposed on the welding circuit during open circuit conditions for reestablishing the welding arc; the improvement comprising an inductance connected in series between said source of welding power and said electrode such that the welding current is passed through said inductance, a capacitance connected in parallel with said inductance and selected to form a resonant circuit at the basic frequency of said generator circuit, and means forming an inductive link coupling circuit between said high-frequency generator and said inductance such that during open circuit conditions in the welding circuit the high-frequency oscillations are coupled into the welding circuit through said resonant circuit, establishment of the welding arc by the high-frequency current causing a flow of welding current through said inductance which operates automatically to cause detuning of the resonant circuit thereby to suppress the amount of high-frequency energy present in the welding circuit so long as the arc is maintained.

2. Arc welding apparatus as defined in claim 1, wherein said link coupling circuit includes step-down coupling means providing an output for said high-frequency generator, step-up coupling means associated with said inductance, and a high-frequency low voltage transmission line connecting said coupling means to each other to minimize radio frequency radiation from the transmission of high-frequency energy into the welding apparatus.

3. Apparatus as defined in claim 1 wherein an adjustable means is incorporated in said link coupling circuit to provide an adjustment of high frequency intensity coupled into the welding circuit.

4. Arc welding apparatus as defined in claim 3 wherein said input coupling means is a loose coupling from said transmission line to the inductance in said resonant circuit to provide a highly selective coupling between the transmission line and the resonant circuit which will quickly decouple as a result of detuning of the resonant circuit with flow of welding current therethrough.

5. In an arc welding apparatus the combination of a welding power supply, leads extending from said power supply for connection to a workpiece and to a welding electrode respectively forming with said power supply a welding circuit, a capacitor and an inductance connected in parallel and having selected values to provide a resonant circuit, said resonant circuit being connected in series between said power supply and the one of said leads extending to the electrode, a high frequency generator including an oscillator circuit and a power supply therefor and being arranged to generate high frequency high voltage electrical power, step-down coupling means connected to said oscillator and forming the output therefrom, a transmission line connected to said step-down coupling means for transmitting high frequency relatively low voltage energy at power which minimizes radio frequency radiation from said transmission line, step-up coupling means connected between said transmission line and said resonant circuit for applying high voltage high frequency power into said welding circuit and across the gap between the electrode and the workpiece where a welding arc is desired, said resonant circuit and said step-up coupling means being constructed and arranged such that establishment of a welding arc and flow of current from said welding power supply through the welding circuit will produce detuning of said resonant circuit to minimize the transmission of high frequency power into said welding circuit and thus to reduce high frequency radiation during normal welding operations from both the transmission line and the welding circuit, and means shielding said high frequency generator to minimize high frequency radiation therefrom.

6. Arc welding apparatus as defined in claim 5, wherein said oscillator circuit includes means forming a spark gap, a coil forming part of said step-down coupling means and connected across said spark gap means, an input transformer connected to supply input power to said oscillator circuit, and radio frequency choke means connected between said input transformer and said oscillator circuit.

References Cited by the Examiner

UNITED STATES PATENTS

| | | | |
|---|---|---|---|
| 1,194,154 | 8/1916 | Eastham | 331—127 |
| 2,106,428 | 1/1938 | Hofmann | 331—127 |
| 2,363,332 | 11/1944 | Jennings et al. | 315—174 |
| 2,399,377 | 4/1946 | Pakala et al. | 315—174 |
| 2,499,155 | 2/1950 | O'Neil | 331—127 X |
| 2,731,585 | 1/1956 | Rousseau | 315—248 |
| 2,898,516 | 8/1959 | Volff | 315—174 X |
| 3,037,145 | 5/1962 | Warner et al. | 315—174 X |

JAMES W. LAWRENCE, *Primary Examiner.*

C. R. CAMPBELL, *Assistant Examiner.*